United States Patent
Jakobsson et al.

(10) Patent No.: US 8,199,985 B2
(45) Date of Patent: Jun. 12, 2012

(54) AUTOMATIC INTERPRETATION OF 3-D MEDICINE IMAGES OF THE BRAIN AND METHODS FOR PRODUCING INTERMEDIATE RESULTS

(75) Inventors: David Jakobsson, Malmö (SE); Jens Richter, Staffanstorp (SE); Andreas Järund, Helsingborg (SE)

(73) Assignee: Exini Diagnostics Aktiebolag (SE)

(*) Notice: Subject to any disclaimer, the term of this patent is extended or adjusted under 35 U.S.C. 154(b) by 699 days.

(21) Appl. No.: 12/294,112

(22) PCT Filed: Mar. 26, 2007

(86) PCT No.: PCT/EP2007/052890
§ 371 (c)(1), (2), (4) Date: Feb. 16, 2009

(87) PCT Pub. No.: WO2007/110420
PCT Pub. Date: Oct. 4, 2007

(65) Prior Publication Data
US 2010/0067761 A1    Mar. 18, 2010

Related U.S. Application Data

(60) Provisional application No. 60/743,728, filed on Mar. 24, 2006.

(51) Int. Cl.
*G06K 9/00* (2006.01)
(52) U.S. Cl. ........ 382/128; 382/190; 382/195; 382/199; 382/203

(58) Field of Classification Search .................. 382/128, 382/190, 195, 199, 203
See application file for complete search history.

(56) References Cited

U.S. PATENT DOCUMENTS

| | | | |
|---|---|---|---|
| 6,195,409 B1 * | 2/2001 | Chang et al. | 378/20 |
| 6,366,797 B1 * | 4/2002 | Fisher et al. | 600/410 |
| 6,430,430 B1 | 8/2002 | Gosche | |
| 2005/0065432 A1 | 3/2005 | Kimura | |
| 2005/0165294 A1 * | 7/2005 | Weiss | 600/410 |
| 2010/0049035 A1 * | 2/2010 | Hu et al. | 600/425 |

FOREIGN PATENT DOCUMENTS

SE    524500 C2    8/2004

OTHER PUBLICATIONS

Cootes, T. F., et al., "Chapter 4—Statistical Shape Models", *Statistical Models of Appearance for Computer Vision*, Wolfson Image Analysis Unit, Imaging Science and Biomedical Engineering, University of Manchester, Manchester, United Kingdom, (2000), 9-25.

(Continued)

*Primary Examiner* — Wai Sing Louie
(74) *Attorney, Agent, or Firm* — Schwegman, Lundberg & Woessner, P.A.

(57) ABSTRACT

Methods for fully automatic quantification and interpretation of three dimensional images of the brain or other organs. A system for Computer Aided Diagnosis (CAD) of diseases affecting cerebral cortex from SPECT images of the brain, where said images may represent cerebral blood flow (CBF). The methods include image processing, statistical shape models, a virtual brain atlas, reference databases and machine learning.

10 Claims, 13 Drawing Sheets

CARE Dementia - Schematic Concept

OTHER PUBLICATIONS

Cootes, T. F., et al., "Chapter 7—Active Shape Models", *Statistical Models of Appearance for Computer Vision*, Wolfson Image Analysis Unit, Imaging Science and Biomedical Engineering, University of Manchester, Manchester, United Kingdom, (2001), 34-38.

Gonzalez, R. C., et al., *Digital Image Processing*, (Second Edition, Prentice Hall, New Jersey), (2002), 678-679.

Haykin, S., "Chapter 1—Introduction and Chapter 2—Learning Processes", *Neural Networks—A Comprehensive Foundation*, (Second Edition, Prentice Hall, New Jersey), (1999), 1-111.

Haykin, S., "Chapter 4—Multilayer Perceptrons", *Neural Networks—A Comprehensive Foundation*, (Second Edition, Prentice Hall, New Jersey), (1999), 156-253.

Haykin, S., "Chapter 7—Committee Machines", *Neural Networks—A Comprehensive Foundation*, (Second Edition, Prentice Hall, New Jersey), (1999), 351-389.

International Application Serial No. PCT/EP2007/052890, International Preliminary Report on Patentability mailed Sep. 22, 2008, 14 pgs.

"International Application Serial No. PCT/EP2007/052890, International Search Report mailed Nov. 8, 2007", 8 pgs.

International Application Serial No. PCT/EP2007/052890, Written Opinion mailed Nov. 8, 2007, 16 pgs.

Alpert, N. M., et al., "The Principal Axes Transformation—A Method for Image Registration", *Journal of Nuclear Medicine*, 31, (1990), 1717-1722.

Brett, M., et al., "The problem of functional localization in the human brain", *Nature Reviews*, 3, (2002), 243-249.

Caunce, A., et al., "Using Local Geometry to Build 3D Sulcal Models", *Proceedings, 16th International Conference on Information Processing in Medical Imaging (IPMI '99) / Lecture Notes in Computer Science*, vol. 1613, (1999), 196-209.

Ciulla, C., et al., "Development and Characterization of an Automatic Technique for the Alignment of fMRI Time Series", *Brain Topography*, 14(1), (2001), 41-55.

Defigueiredo, R. J., et al., "Neural-network-based classification of cognitively normal, demented, Alzheimer disease and vascular dementia from single photon emission with computed tomography image data from brain", *Proc. Natl. Acad. Sci. USA*, 92, (1995), 5530-5534.

Duta, N., et al., "Segmentation and Interpretation of MR Brain Images: An Improved Active Shape Model", *IEEE Transactions on Medical Imaging*, 17(6), (1998), 1049-1062.

Fleming, J. S., et al., "Measurement of cerebral perfusion volume and $^{99m}$Tc-HMPAO uptake using SPECT in controls and patients with Alzheimer's disease", *Nuclear Medicine Communications*, 23, (2002), 1057-1064.

Hammers, A., et al., "Implementation and Application of a Brain Template for Multiple Volumes of Interest", *Human Brain Mapping*, 15, (2002), 165-174.

Hanyu, H., et al., "Cerebral blood flow patterns in Binswanger's disease: a SPECT study using three-dimensional stereotactic surface projections", *Journal of the Neurological Sciences*, 220(1), (2004), 79-84.

Hill. A., et al., "Model-Based Interpretation of 3D Medical Images", *Proceedings of the 4th British Machine Vision Conference (BMVC93)*, (Sep. 21-23, 1993, University of Surrey, Guildford, United Kingdom), (1993), 339-348.

Minoshima, S., et al., "A Diagnostic Approach in Alzheimer's Disease Using Three-Dimensional Stereotactic Surface Projections of Fluorine-18-FDG PET", *The Journal of Nuclear Medicine*, 36(7), (1995), 1238-1248.

Mitchell, S.C., et al., "3-D Active Appearance Models: Segmentation of Cardiac MR and Ultrasound Images", *IEEE Transactions on Medical Imaging*, 21(9), (2002), 1167-1178.

Sheppard, S. J., et al., "Diagnosis of Single Photo Emission Tomography Images Using Artificial Neural Networks", *IEE Colloquium on Medical Imaging: Transduction and Parallel Processing*, (London, United Kingdom), (1992), pp. 3/1-3/3.

\* cited by examiner

FIGURE 1: CARE Dementia – Input Images
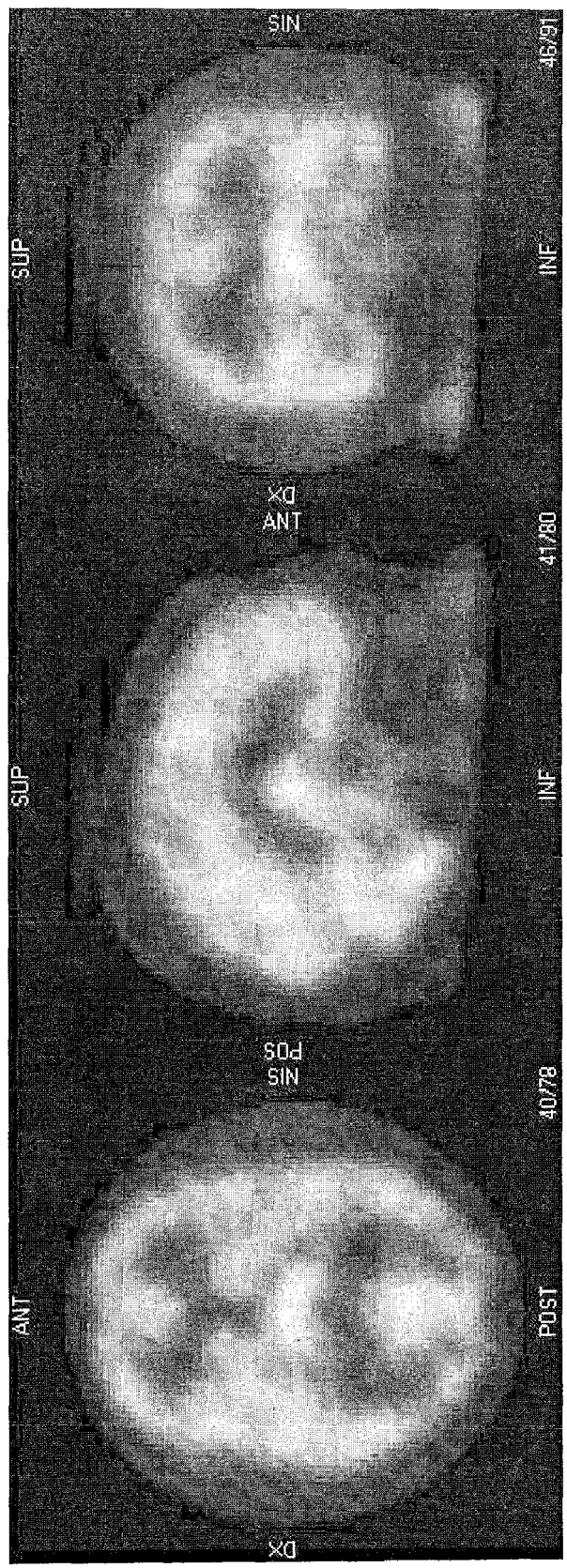
Transaxial, sagittal and coronal view of a CBF-SPECT image.

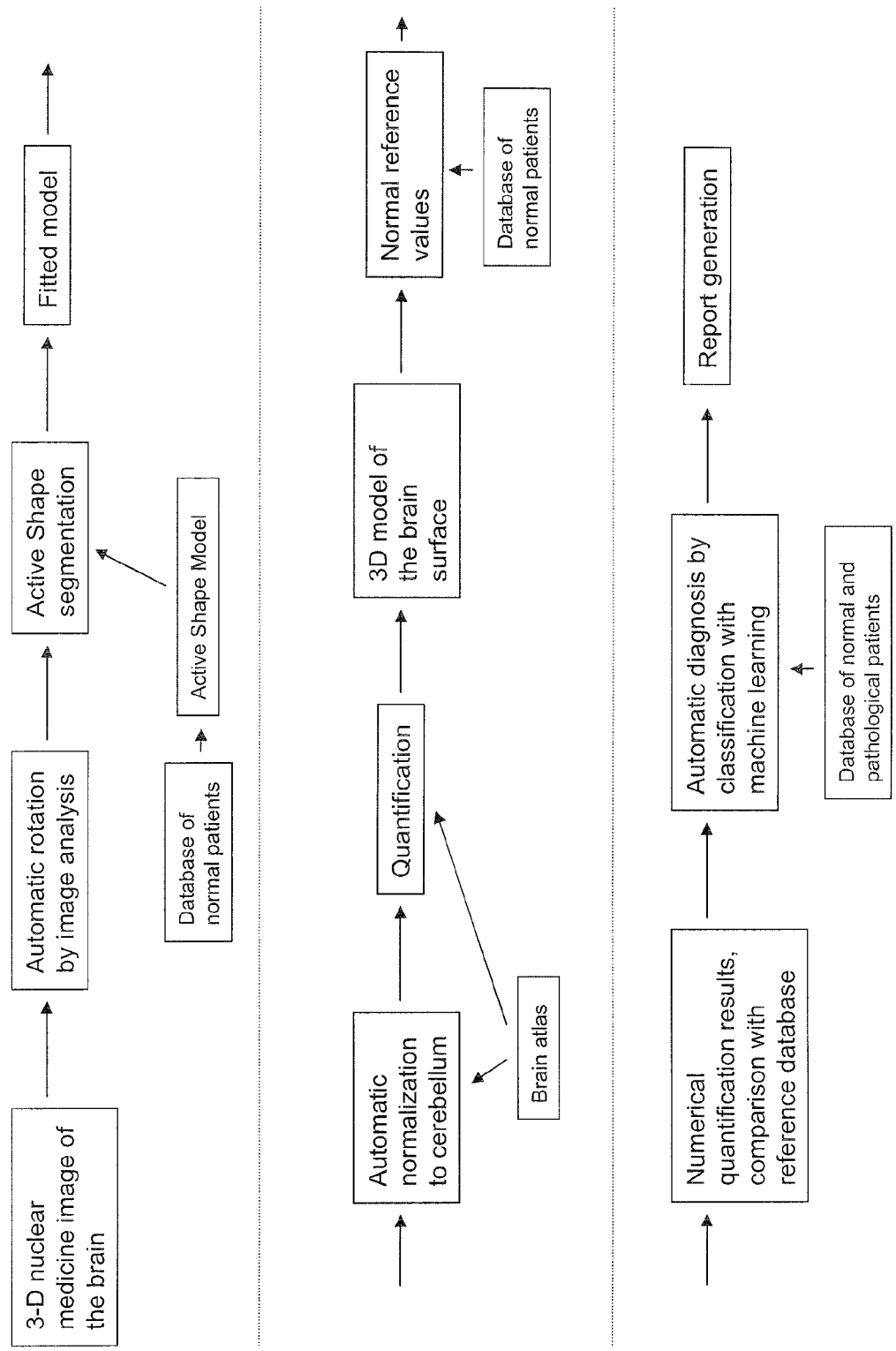
FIGURE 2: CARE Dementia - Schematic Concept

FIGURE 3: Automatic Rotation
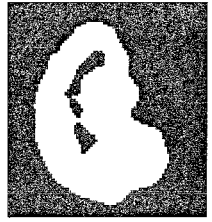
Thresholded sagittal slice, PCA is applied on the coordinates of the white pixels.
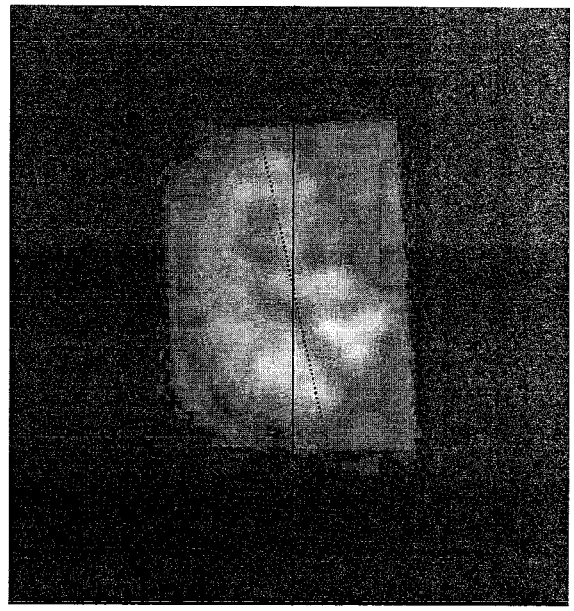
First PCA-vector in the unrotated image, the direction of the largest extension of the brain.
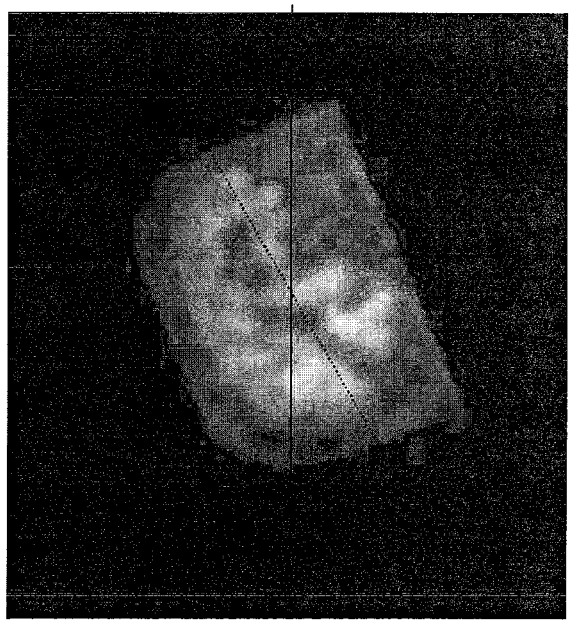
First PCA-vector in the rotated image. The offset angle is the difference between the first PCA-vector and the x-axis.

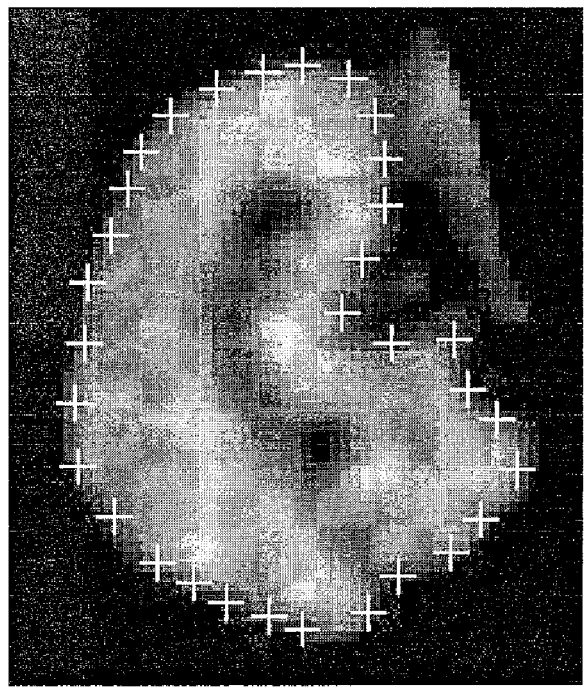
FIGURE 4: Active Shape Model - Landmarks

FIGURE 5: Active Shape Model – Surface Mesh
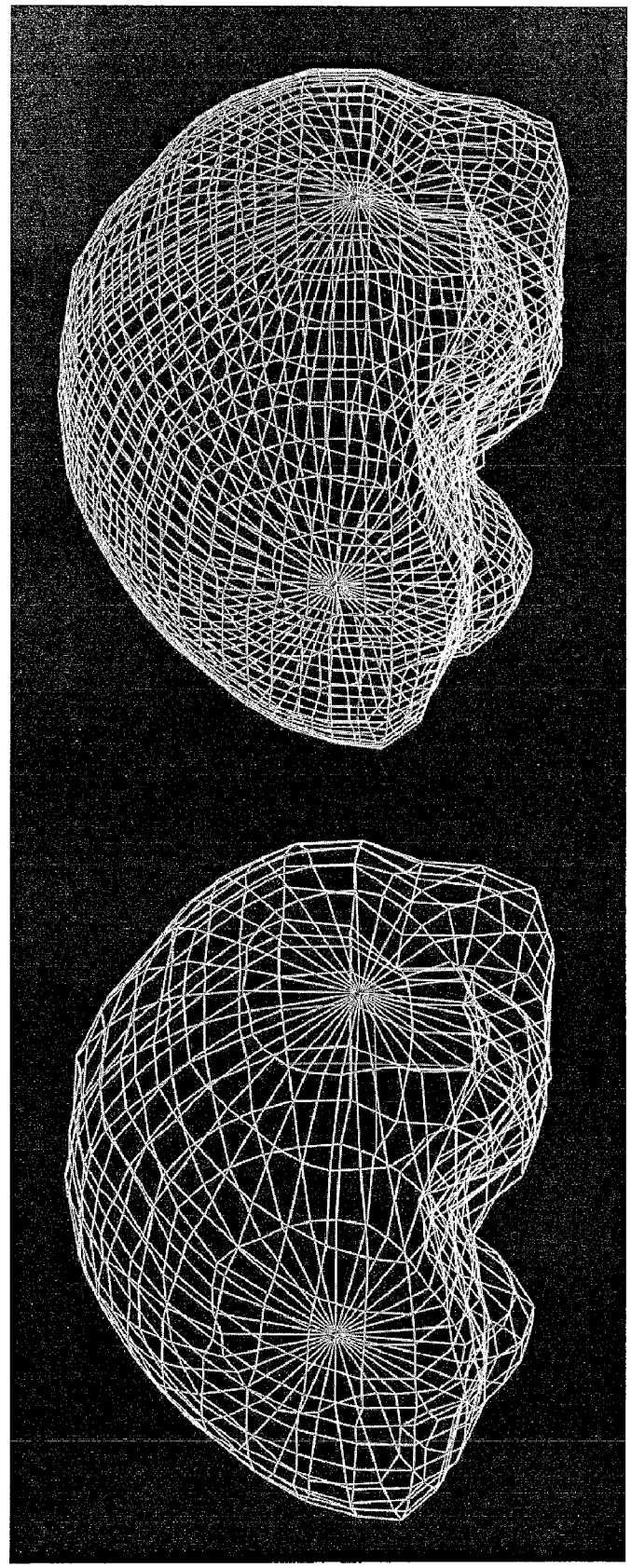
The mesh built up by the 546 point of the ASM (left) and the refined mesh used for quantification (right).

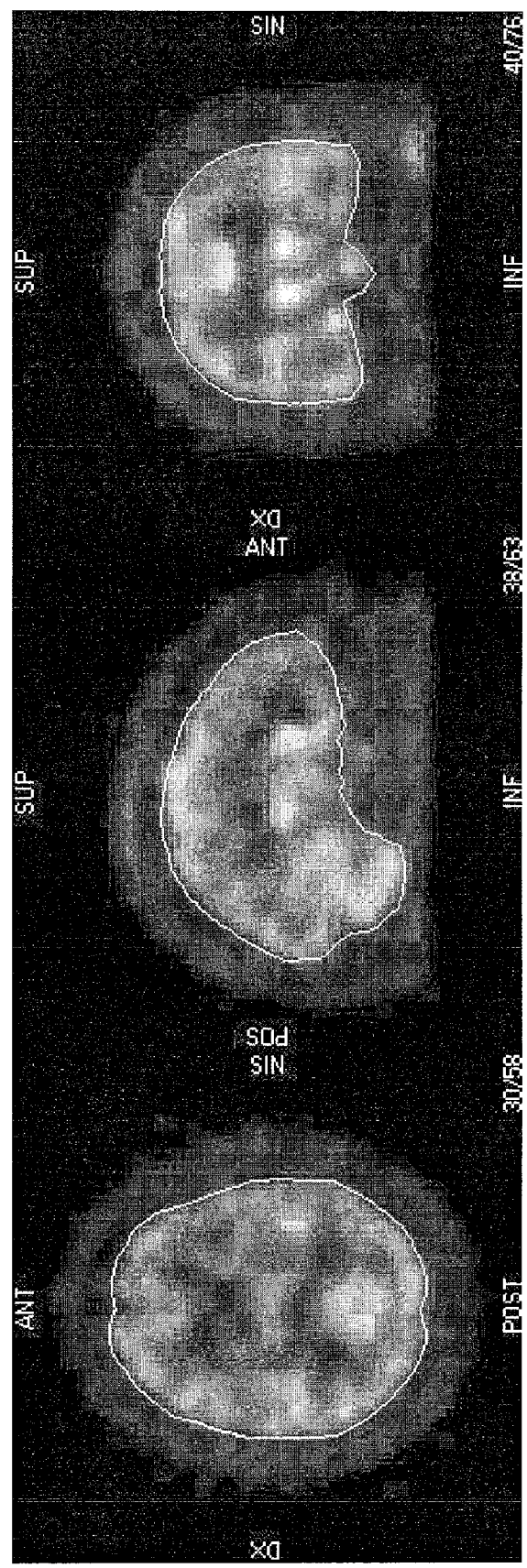
FIGURE 6: Outline Results
The white boundaries show the segmentation achieved by the Active Shape algorithm.

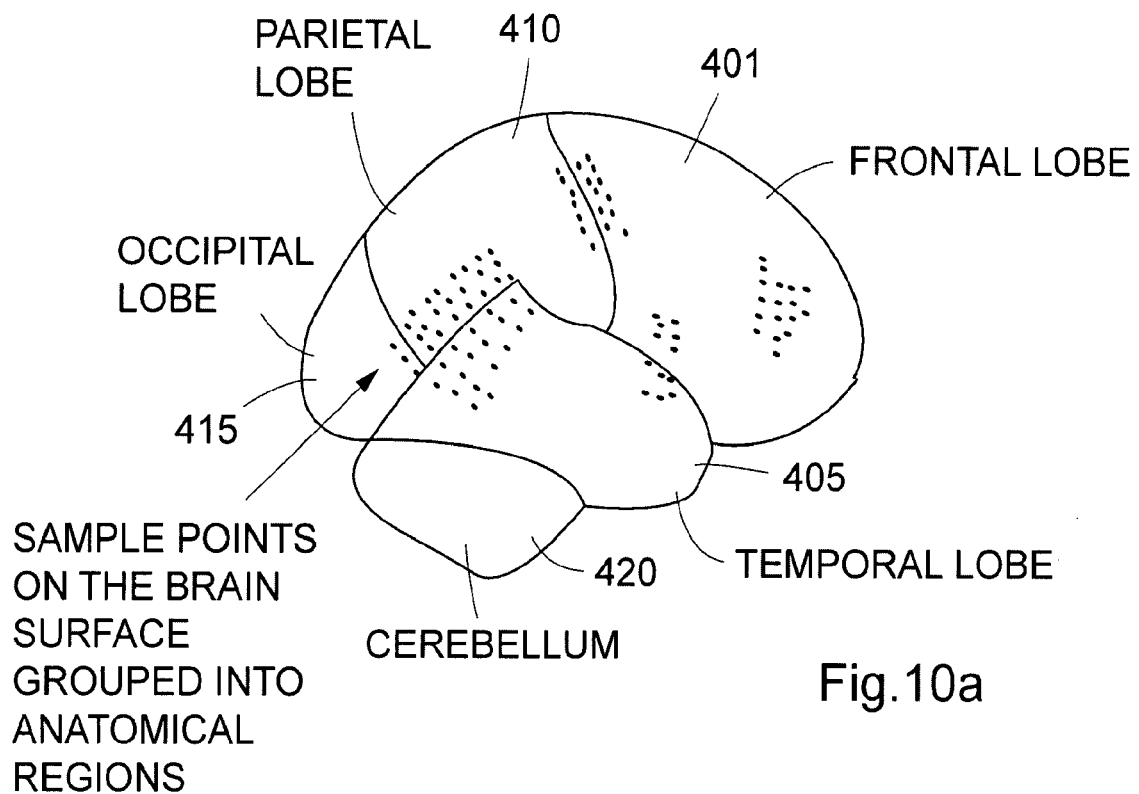
Fig.10a
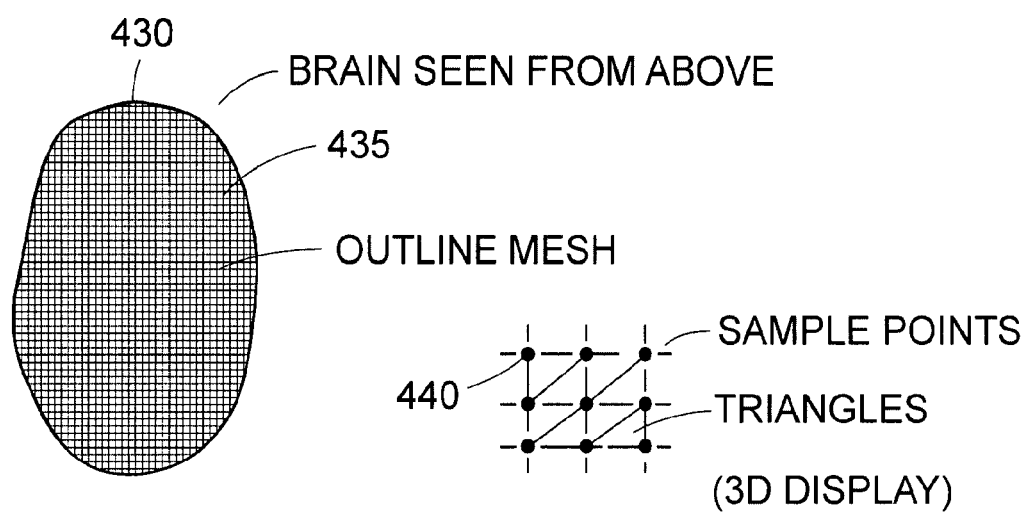
Fig.10b
Fig.10c

AUTOMATIC INTERPRETATION OF 3-D MEDICINE IMAGES OF THE BRAIN AND METHODS FOR PRODUCING INTERMEDIATE RESULTS

FIELD OF THE INVENTION

The present invention relates to the field of processing and interpreting medical images.

BACKGROUND OF THE INVENTION

Diagnosing based on 3-D nuclear images of the brain, such as SPECT images of cerebral blood flow (CBF) and DaTSCAN images, is difficult and time demanding and relies on visual interpretation and numerical quantification of the images. The existing systems for displaying and quantifying such images bring a lot of manual work for the physician which may have to mark region(s) of interests with geometrical templates. This takes a lot of time and the accuracy of the segmentation is poor.

SE 524500 discloses a method and a device for determining of a three dimensional contour of an organ in a patients body, starting from an image of said organ. The method comprises a step of adjusting a predefined contour model to the image of said organ.

The object of the present invention is therefore to provide a method for reducing the need for manual work to create an image fully comparable with a normal reference image.

It is also an object of the present invention to provide a method for creating such a normal image, and it is a further object to provide a method for automatically providing a second opinion regarding the normality/pathologicality of said image.

SUMMARY OF THE INVENTION

The present invention provides a system for Computer Aided Diagnosis (CAD) of dementia and related diseases in SPECT images of cerebral blood flow (CBF). The invention is a solution for fully automatic quantification and interpretation of for example CBF by using image processing and analysis, statistical shape models, a virtual brain atlas, reference databases and machine learning. By using Active Shape technique, a segmentation of the brain surface that is superior to existing systems in clinical use can be achieved. The methods are applicable for other types of 3-D nuclear images of the brain or other organs for which the diagnostic procedure is similar. The overall purpose of the invention is to achieve time saving in the clinical workflow and more accurate diagnoses.

Thus, according to a first aspect the invention provides a method for determining a contour of an organ in a patients body, from an image of the organ in at least three dimensions, by adjusting a predefined contour model to the image, where said body organ is a brain.

According to another aspect is provided a method for creating a brain shape model, the method comprising the following steps:

providing images of a number of healthy reference brains;
making a statistical analysis of said images, including
reorienting said images into a common coordinate system, using at least two landmark points corresponding to anatomical landmarks of the brain.

Further is provided a method for automatic interpretation of a three dimensional medicine image representing a body organ where said method comprises the following steps:

(a)—automatically rotating the images to adjust for accidental tilting when the images was originally taken
(b)—automatically finding the contours of the organ
(c)—automatically adjusting size, position, rotation, and shape of a predefined model shape of the type of organ in question to fit the organ of the current image
(d)—automatically, with the aid of the model shape, defining certain portions of the image (e)—normalizing the intensity of the image
(f)—quantifying each point in the image of the organ, producing a quantification result;
(g)—feeding the quantification results to an interpretation system;
(h)—letting the interpretation system interpret the image, producing an interpretation result;
(i)—presenting the interpretation result;

Said normalisation may be performed by giving an area of the cerebellum with highest activity a reference value corresponding to 100%.

Said quantifying of each point in the image of the brain may involve sampling along a vector perpendicular to the contour of the brain.

Intensity values may produced both point-by-point and region-by-region.

According to a further aspect is provided an image classification system for labelling an image into one of two or more classes, the system comprising:

a pretrained artificial neural network having a plurality of inputs nodes, and a number of output nodes;
a feature extractor, capable of extracting a number of features from said image, said features being suitable for feeding to the input nodes; where the pretrained artificial network presents a classification result on the number of output nodes when the number of features of the image is fed to the plurality of input nodes.

The classification system where the image is a three dimensional brain image.

The classification system wherein said number of features comprises a total number of points inside a contour of a brain of said brain image.

The classification system, wherein said number of features comprises number of points in largest cluster of points below a certain threshold inside a contour of a brain of said brain image.

Further is provided a method for automatic rotation by thresholding and Principal Component Analysis, and also a method for region based quantification comprising the step of:

combining a brain atlas with active shape models

According to still another aspect is provided a method for automatic normalization of brain images comprising the steps of using a brain atlas and active shape models with cerebellum as reference And a method for visualizing brain lobes and regions on a three dimensional model comprising using a brain atlas
using active shape models Further, a method for classification of images comprising the steps of:

feeding the quantification results of claim 1 to an artificial neural network Further, a click orientation tool useable in 2-D slice view were a click on a point in one view automatically retrieves and shows the corresponding slices in the other views.

Still further is provided a method for automatic report generation.

According to still a further aspect is provided a method for reorientation of brain images into a common coordinate system, comprising the following steps:

for each reference brain, provide a midline sagittal slice;
for the midline sagittal slice, finding and marking the "occipital-cerebellum notch";
for the midline sagittal slice, finding and marking the lowest point of the frontal lobe;
drawing a line between the occipital-cerebellum notch and the lowest point of the frontal lobe;
orienting the image such that said line becomes horizontal, i.e., parallel to the x-axis;
finding foremost point of frontal lobe;
position the image such that the x-axis runs through foremost point of frontal lobe;
finding the "cerebellum-temporal lobe notch";
positioning the image such that the y-axis runs through said cerebellum-temporal lobe notch;

BRIEF DESCRIPTION OF THE DRAWINGS

The present invention will be further described with the aid of the accompanying drawings of which:

FIG. 1 contains an example of a CBF-SPECT image in the three views that are referred to in this description.

FIG. 2 is a schematic diagram of the process from input of 3-D nuclear images of the brain (or other organs) to quantification results, automatic diagnosis and report generation.

FIG. 3 shows the concept of using Principal Component Analysis for automatic rotation.

FIG. 4 shows an example slice of how the landmarks are placed in the sagittal view for the construction of the Active Shape Model (ASM).

FIG. 5 shows the mesh built up by the ASM and the refined mesh used for quantification.

FIG. 6 shows an example of the outline result of the Active Shape segmentation.

FIG. 8 b is a flowchart of method for creating a brainshape model.

FIG. 8 c is a flowchart of further steps of the method of FIG. 8 b.

FIG. 8 d is a schematic view of a sagittal brain slice showing certain points of interest on brain envelope.

FIG. 10a is an overview over a number of anatomical regions of the brain cortex.

FIG. 10b is a schematic drawing of an outline mesh used in the invention.

FIG. 10c is a detail of the mesh of FIG. 10b.

DETAILED DESCRIPTION OF PREFERRED EMBODIMENTS

Figure 7:
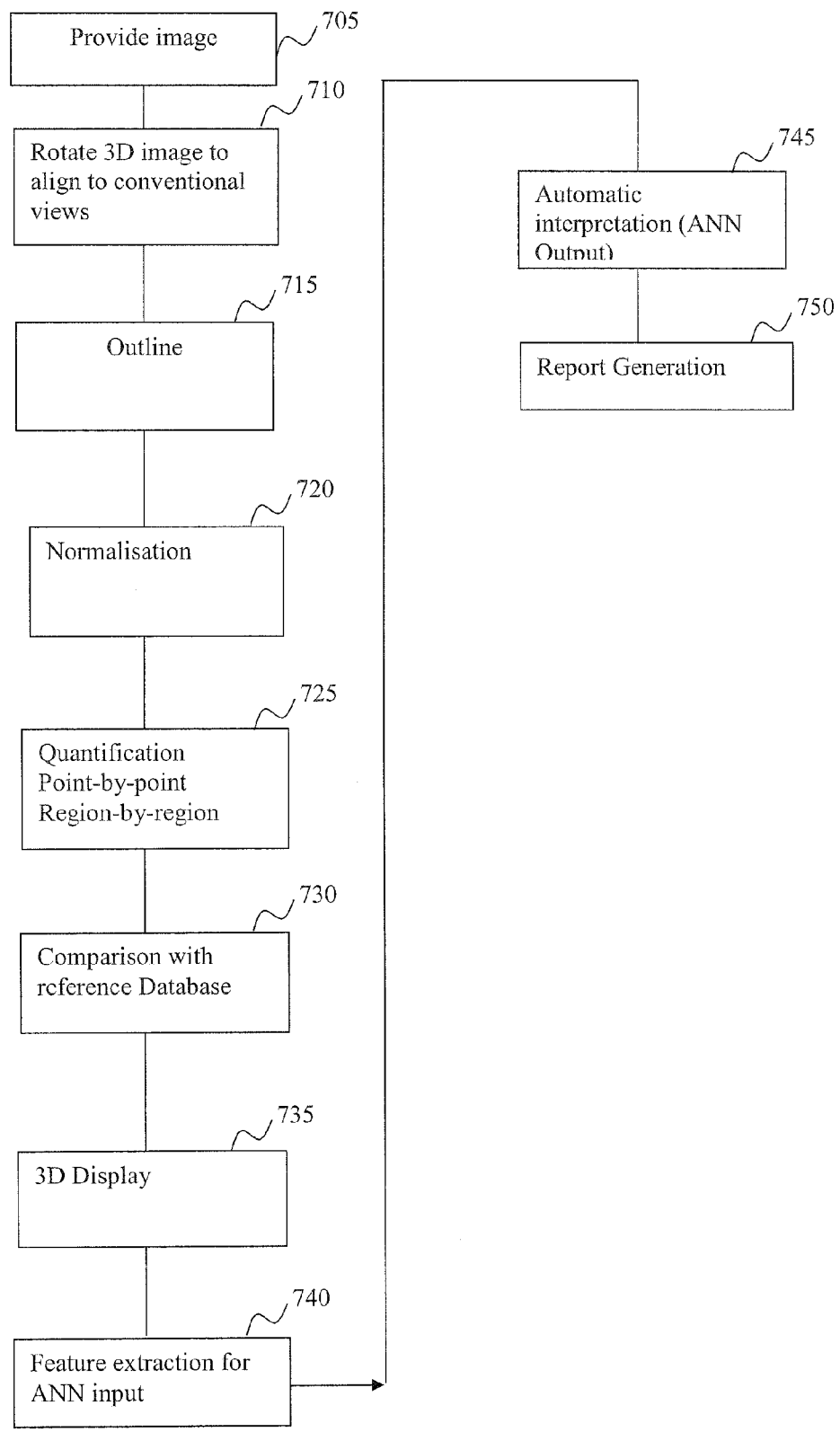
FIG. 7 shows an overview flowchart of a method for computer aided interpretation of 3D nuclear images of the brain.

Definitions and Abbreviations 3D image—The term "3D image" refers to a representation of a three dimensional object. The representation is mostly digital, comprising a number of 3D pixels, here called voxels, each voxel having a value representing an intensity value captured by an imaging device, and corresponding to each object voxel, when generating the image of the object. Suitable 3D images can be generated, for example, by SPECT cameras, and MRI cameras.

CBF—the abbreviation "CBF" stands for "cerebral blood flow"

Contour finding—The term "contour finding" refers to the activity of finding, in a representation of a three dimensional object, the contour of the object. In the case of the present invention, it refers to the activity of finding the contour of a body organ, i.e., finding a surface that defines the outer contour of the body organ, in particular the brain.

Image rotation—The "terms image reorientation", "image rotation" and "image alignment" refers to the activity of aligning a 3D image of an organ such that the organ is oriented in relationship to a local x, y and z-axes according to some convention. coordinate system of the organ is aligned to an external coordinate system comprising a viewpoint for creating viewable images.

Outline—The term "to outline" refers to the activity of finding a contour, see above.

The term "the outline" refers to the contour of an object.

PCA=Principal Component Analysis.

Reference angle—The term "reference angle" refers to an angle expressing how an image volume should be rotated to achieve a standardised orientation.

Segmentation—The term "segmentation" refers to the activity of adjusting a shape model such that said shape model coincides, or approximately coincides as good as the used method allows, with the shape of an image of a particular organ of a particular patient. The term "segmentation" also refers to the activity of partitioning an digital image into two or more regions. Here it also refers to the activity of partitioning, in a representation of a three dimensional organ, the surface of the organ such that resulting partitions is corresponding to partitions of a reference data set.

Input

The methods are intended for 3-D nuclear medicine images of the brain, such as Single Photon Emission Computed Tomography (SPECT) and Positron Emission Tomography (PET) images, representing for example cerebral blood flow (CBF) or receptor density. It may also be applicable for other types of images of the brain or other organs for which the diagnostic procedure is similar.

Automatic Rotation

A preferred embodiment of the present invention includes a method for automatic rotation of the brain image. Differences in rotation of the brain image are due to head tilting of the patient and the largest variations usually appear in the sagittal view. Today, this is a step that is done manually by the scanner operator before the physician starts reviewing the images. The automatic method gives a suggestion of the rotation which in most cases only need to be approved by the physician. Another advantage is that the automatic rotation becomes more consistent compared to the manual, since different operators do this step differently. The automatic rotation is necessary both for displaying the slice images with a proper rotation for reviewing and for the Active Shape based segmentation described below.

The algorithm uses gray-level thresholding and Principal Component Analysis (PCA), see for example Gonzalez and Woods, Digital Image Processing, Prentice-Hall, Inc. 2002. p. 678-679. PCA is a statistical method for choosing new coordinates for a dataset by a linear transformation. After transformation PCA has been applied the first axis (sometimes called the first PCA vector) will have the direction of the largest variation of the data. The first PCA vector is used for finding a reference angle for how the brain (or the organ) is rotated.

For calculating the three reference angles a few suitable sample slices in each view are chosen. Since brain images are relatively symmetrical around the y-axis in the transaxial view, this is the first view that is considered. Three to five slices, with two to three pixels separation, around the middle transaxial slice are collected. The middle slice refers to the slice that represents the middle of the brain. Gray-level thresholding is applied on the sample slices. It is a simple image processing operation which steps through all the pixels of the image and assigns 1 or 0 depending on if the original pixel value is above or below a threshold value. For CBF-SPECT images, there is a suitable threshold value around 45% of the maximum intensity of the image which makes it possible to roughly extract pixels that represent brain tissue from the rest of the image (skin, flesh, skull and background). When a sample slice has been thresholded, the coordinates of the points that are labeled 1 (the white pixels of FIG. 3) are collected. These coordinates are used for PCA. The angles of the first PCA vectors are calculated for the sample slices and the mean angle of these is are used as reference angle. For the transaxial view, the reference angle is defined from the y-axis which is the direction that should have the largest variation when the image is rotated correctly.

The next view to consider is the sagittal view, which is the most important one since it has the largest variation in rotation. To avoid facial uptake in the sagittal sample slices, they are chosen a little bit off the middle slice. Facial uptake occurs around the nose area and is most often limited to the middle of the brain in the sagittal view. The transaxial sample slices are used to locate the middle sagittal slice. From the collected points of the sample slices, representing brain tissue, the center of gravity is calculated. That is the mean coordinate of the pixels labeled 1 in the thresholded image. The x-coordinate of the center of gravity is equal to the middle sagittal slice and the y-coordinate is equal to the middle coronal slice. Four sagittal slices are collected, two on each side of the middle slice, the first two on a distance of around 15-25 mm and the next two on a distance of 25-35 mm. The same approach of calculating the reference angle with PCA is taken for the sagittal sample slices. For the sagittal view, an offset is used of around 15-25 degrees to get the correct rotation for displaying. This means that when the image is rotated, the difference in angle between the x-axis of the sagittal view and the vector that points out the largest variation should have this offset.

Finally, the reference angle for the coronal view is calculated. In the coronal view the direction of the largest variation can differ 90 degrees depending on which sample slices that are chosen and the shape of the brain. It is not clear whether the reference angle should be calculated from the x-axis or y-axis of the coronal view. It is however safe to assume that the reference angle should not be below −45 degrees or above 45 degrees. The reference angles are calculated both from the x-axis and the y-axis for all the sample slices and the ones with the lowest absolute value are accepted. The mean angle is calculated from the reference angles of the sample slices and is used to rotate the image.

Active Shape Segmentation

Active Shape Models (ASMs), see T. F. Cootes and C. J. Taylor, Statistical Models of Appearance for Computer Vision, Wolfson Image Analysis Unit, Imaging Science and Biomedical Engineering, University of Manchester, 2000. p. 9-25, 34-38, are used for segmentation of the brain surface. It can be described as a statistical contour model built of a database of examples (training datasets) of the object that is going to be segmented. The model consists of a mean shape and information about the statistical variation of the training set.

With Active Shape Models it is possible to segment the brain surface in a way that is superior to existing methods that demand manual placement of regions of interest. In the existing methods, these regions of interest are segmented with geometrical template shapes that can be translated, scaled and rotated. That kind of segmentation is very limited. Active Shape Models give the contours of the brain with high precision which makes it possible to quantify the cortex (brain surface) with high accuracy. The cortex is where the most valuable diagnostic information is in CBF images.

The datasets have been collected manually by marking landmarks in a certain order on the brain surface, slice by slice in the 3-D image. A database of patients with normal CBF was used for this matter. The sagittal view was chosen for clicking out the training examples. The reason for that is because the brain shape appears as one connected region in all slices. In the transaxial and coronal view the brain parts can be divided into separated regions in some slices. A number of slices and a number of points have been defined for the model. In a preferred embodiment these numbers are 17 slices and 32 points plus one start and one end slice with one point each. This gives 546 points, or landmarks, for each training example for the construction of the ASM. A landmark is a point that has a specific position on the shape. A start slice, end slice and middle slice was chosen and the slices in between was spread out with equal space. The middle slice of the model is meant to lie between left and right brain. The points for each slice are clicked out in a way that is shown in the drawings. The point data is connected with triangles to form a mesh which can be used for calculation and 3D-visualization. The ASM is built and used as described by Cootes and Taylor.

The Active Shape theory is generally known but to adapt it for a new type of images, in this case brain images, two problems need to be solved:
1. Making an initial guess of the scaling, translation and rotation.
2. Searching for landmarks on the brain surface to fit the model to.

To make the initial guess, the automatic rotation algorithm comes to use once more for deciding the orientation of the unknown brain image. We also have the center of gravity of the brain volume by calculating the mean coordinates of the sample slices from the automatic rotation which means that the translation is known. For deciding the scaling the extension is calculated for one of the thresholded sample slices of the sagittal view by locating the extreme points. The points of the thresholded pixels of the sagittal slice are collected and the maximum and minimum x-coordinates are used. The extension in the x-direction is calculated by subtracting the minimum coordinate from the maximum. With this information the model can be enlarged to roughly fit the brain surface by dividing the extension of the thresholded sample slice with the extension of the mean shape in the ASM. At this step the model only has the mean shape of the brains in the database that the model is built of.

The next step is to adjust the shape of the model which is done iteratively. For each point of the model the normal is calculated, which is done by calculating the eight normals of the eight triangles that are formed by the point and its eight neighboring points in the model mesh. The normal vectors are perpendicular to the surface and are used to search for new landmarks to adjust the ASM to.

The normals are scanned inwards and outwards to a certain distance from the surface and with a certain step size, sampling the intensity values of the image data. There are several ways to sample image data. In a preferred embodiment is used a linear sampling of the 27 pixels that surrounds the point. For CBF-SPECT images a step size of one pixel is enough. The distance should not be too long since it may result that points that have similar attributes as the brain surface are found. It should be as long that it is possible to reach the surface of the brain for at least some points in the first search from the initial guess. The point along the sample vector that is most likely to lie on the brain surface is chosen, which is done in the following way. The image data at the brain surface has two distinguish features:

1. Ranging between 35%-55% percent of the maximum image volume intensity.
2. Strong intensity drop when going from brain tissue to background.

These two observations are used by the algorithm to decide which point that best matches the brain surface. The first criterion is simply the intensity value of the sampling. For deciding the second one a derivative filter is applied on the sampled intensity data with discrete convolution, see for example 1. We will get a positive derivative when going from high to low intensity and negative when going in the opposite direction. The algorithm searches for the highest positive derivative. If no sample is in range of the first criterion the landmark of the point is not moved. New points are chosen for each landmark that matches the criteria. The ASM is fitted to the new points and the procedure is iteratively repeated until convergence or until no point moves more than for example one pixel.

Brain Atlas

A brain atlas has been constructed for usage together with the shape model. The atlas defines which brain lobe each landmark belongs to and is used both for the automatic quantification and visualization of the brain lobes on the 3-D model. The brain atlas is based on images from MRI of the brain.

The brain atlas was built manually by clicking out the landmarks of the ASM in an MRI image, in the same way as for the training examples of which the ASM was constructed by. Each landmark was labeled by a physician as belonging to one of the brain lobes or regions of the brain surface. The brain atlas is used together with the ASM to determine which points that for example belong to the frontal lobe.

Automatic Normalization

Brain images are usually normalized by the maximum intensity of the cerebellum, which is not always the maximum of the image volume. With the information of the brain atlas and the ASM, the maximum intensity of the cerebellum and its location can be decided. In the coordinate system of the transaxial view, the highest and lowest z-coordinates of the cerebellum points in the fitted model are used to limit the search for the maximum intensity value in the image volume. The image slices and 3-D brain are visualized with the normalization value as maximum intensity of the image volume.

Quantification

The mean intensity of the brain surface is calculated for each lobe. For the quantification the number of points in the model is increased by interpolation. Each triangle of the surface mesh is splitted into four triangles of equal size. Intensity values are sampled along the normals inwards from the brain surface. A sampling depth of 15 mm is used which corresponds to around 5-8 pixels depending on the image resolution. The maximum value of the sampling of each landmark is saved as intensity values.

The mean intensity of a brain lobe is expressed with the mean intensity of the whole brain surface as reference. The brain atlas is used to extract the points of the model that belong to a specific lobe and the middle slice of the model is used to divide the lobes into right and left parts. The mean intensities of each lobe are calculated and divided with the mean intensity of the whole brain (the mean intensity of all the points on the brain surface).

Comparison with Reference Database

The quantification is used together with a reference database of patients with normal cerebral blood flow. The mean intensities for each point and each lobe and their standard deviations have been calculated for all the patients in the database. The result is used for comparison with new patients. Differences between a new patient and the normal database are expressed as number of standard deviations from normal mean value of the specific point or lobe (sometimes called z-score). The quantification results are presented in a table and used as inputs in the automatic classification of the patient.

Classification

Artificial Neural Networks (ANNs), see for example Haykin, Neural Networks, A Comprehensive Foundation, Prentice-Hall, Inc. 1999. p. 1-111, p. 156-252, 351-389, or any other machine learning technique such as Support Vector Machines, are used for making the automatic interpretation and generate a computer-based diagnosis based on a large database of patients evaluated by experts in the field. Each patient in the database is labeled with one of the classes that are used. For example two classes can be used where class 1 is normal and class 2 is pathological.

The quantification results as well as other features that are relevant for the diagnosis are used as input to the ANNs. The other features are obtained through image analysis and describe properties such as number of clusters with low intensity (for example a z-score below −2), their sizes and depths. It could also be non-image data such as the age and sex of the patient.

The ANNs compare the quantification results and the features of the new patient with the patients of the database and by doing so the system can predict whether for example dementia occurs in CBF-SPECT images or not. It serves as a second opinion that complements the physician's own diagnosis.

Display

The brain images are displayed both as 2-D slices and as a 3-D flow model. The 2-D slice view includes a click orientation tool which makes it easy to navigate in the 3-D volume. When clicking on a spot in the image of one of the three views, the slices of the spot in the two other views appear together with a cross marking the position. The 3-D view shows the intensity values of the brain surface with a number of different color scales. It is possible to show the different lobes of the brain surface, on the 3-D brain. The user can choose to highlight or shadow a specified lobe of the brain surface. Another 3-D model shows the difference in standard deviations (z-score) from the normal reference database, where a z-score below −2 is shown in red and above 2 is shown in green. The results of the quantification are presented in a table together with the normal values of the reference database.

In a preferred embodiment there is a process tab in the GUI (Graphical User Interface) for quality control of the automatic rotation, segmentation and normalization. If any of these steps fails, they can be corrected manually. In the rotation panel all the three views can be rotated, in the outline panel an initial guess of the Active Shape segmentation can be placed manually and in the normalization panel any point of the image volume can be chosen as normalization point.

Report Generation

When the physician has finished reviewing the images and the quantification result, the next step is to open a report panel and write a report. Before creating the report the physician will get the diagnosis of the automatic interpretation. If it is the same as the physician's the diagnosis is secured, if not it encourage the physician to reconsider his or her interpretation. Slice images as well as 3-D images can be chosen to be included in the report. There is also a autotext function for standard diagnoses and reports. The physician writes a short command and a standardized text comes up where he or she only needs to fill in the patient specific data.

EXAMPLES

Overall Method

FIG. 7 shows an overview flowchart of a method for computer aided diagnosis of 3D images of the brain. The method comprising the following steps:

Automatically rotating 710 three-dimensional image to align to conventional views;
Outlining 715;
Normalisation 720;
Quantification 725, point-by-point, and region-by-region;
Comparison 730 with reference database;
Displaying 735 of results;
Extracting 740 of features for input to artificial neural network (ANN);
Automatic interpretation 745;
Automatic generation 750 of report.

Also provided is a method for the automatic rotation, mentioned above, of a numerical representation of a three dimensional object. The representation comprises a number of 3D pixels, here called voxels, each voxel having a value representing an intensity value corresponding to an amount of some quality of the original object voxel.

The method comprises the following steps:
a first step of providing a first numerical representation of a three dimensional object;
a second step automatically rotating said first representation to form a second representation properly aligned to allow for consistent display of transaxial, sagittal, and coronal view of organ;

The second step comprises the following substeps:
central sulcus of brain is set to coincide with x-y-plane;
direction and position of x and y-axis is performed as explained below, in the section "Method for creating a brain shape model", see also FIGS. 8b and 8d.

Figure 8A:
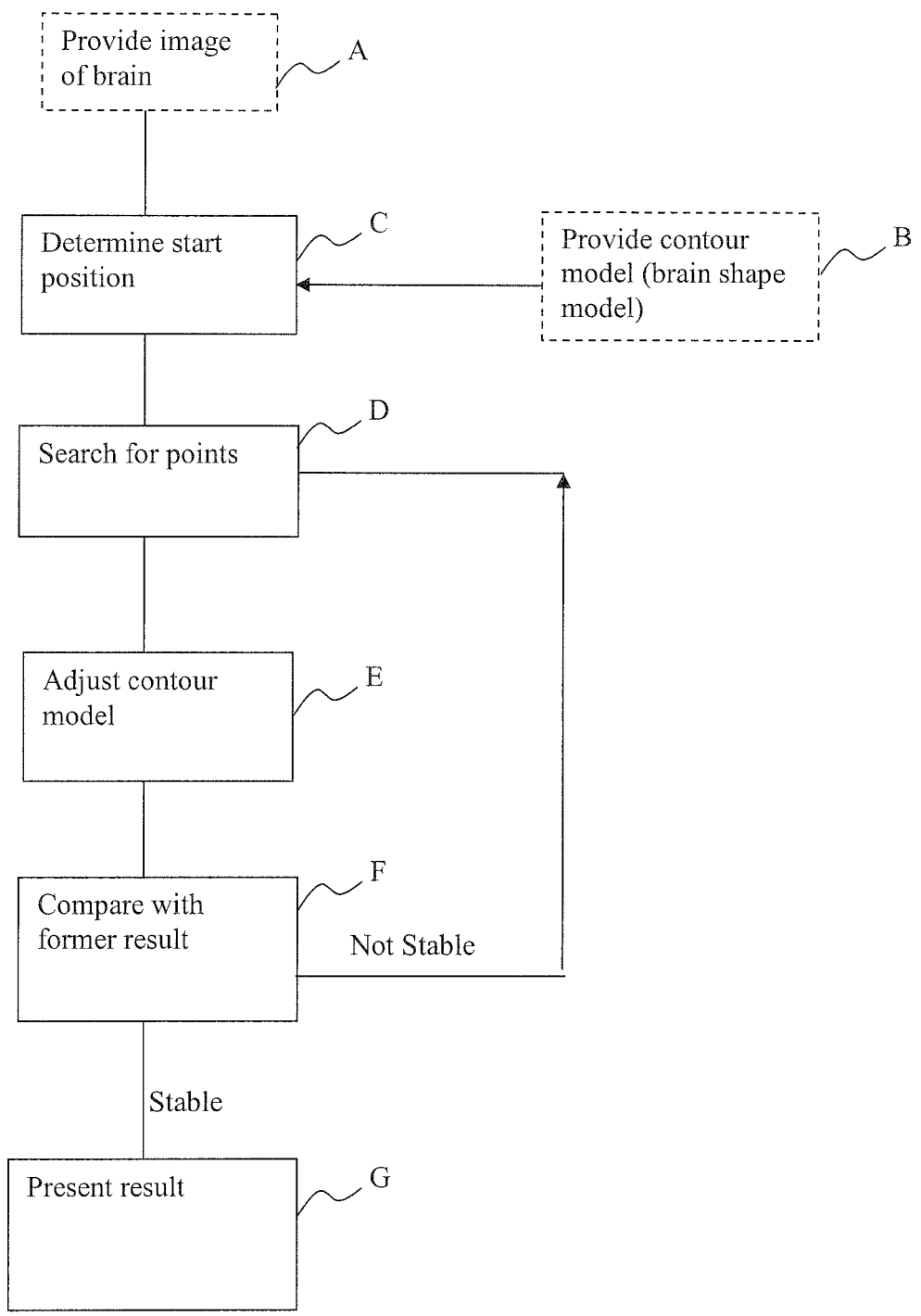
FIG. 8 a is a flowchart of a method for adjusting a contour model of the brain to a certain brain image.

With reference to the flowchart of FIG. 8a, a method for determining a three dimensional contour of a brain is described. The boxes for steps A and B are shown with dashed contours to indicate that they do not form part of the method. They are instead performed as a preparation for the method, to provide input data. In a first step A, an image of a brain is created, the contour of which is to be determined, and which is to be presented, in a processed form, with information indicating possible abnormalities. The image may be generated by a brain scintigraphy apparatus or other image apparatus capable of generating functional images. A three dimensional image is obtained. The image of the brain is stored, as is schematically shown in FIG. 11, in a three dimensional image matrix, where each image point comprises an intensity value. This image matrix is normally of the same dimensions each time a brain is depicted. A common size is 128×128×90 voxels. The image matrix is thus comprised of points, laying in a number of parallel planes. The intensity values in the image matrix may also be normalised at this point or later, see below.

When creating a scintigram of a brain, the image of the brain will land up approximately in the same place in the image matrix, each time. This means that there is no need for searching for the brain, but it is legitimate to assume that it is positioned approximately in the middle of the image matrix.

When making an image of the brain in this way it is normal procedure according to prior art to manually put (rotate) reorientate the brain to a position such that such that the brain is oriented in relationship to x, y and z-axes according to some convention.

This may have the disadvantage of slightly different orientations of different images due to the human factor.

The present invention provides a method for automatic reorientation of a three dimensional brain imageTh x, y and z-axes of the image matrix corresponds to the In a preferred embodiment, the brain is as will be further explained below.

In step B a contour model is created. The term "shape model" will be used instead of "contour model" for the purpose of the present application. The shape model is a cloud of points representing the shape of an organ, in this case the brain, and the term "brain shape model" will also be used for clarity.

Method for Creating Brain Shape Model

Figure 8B:
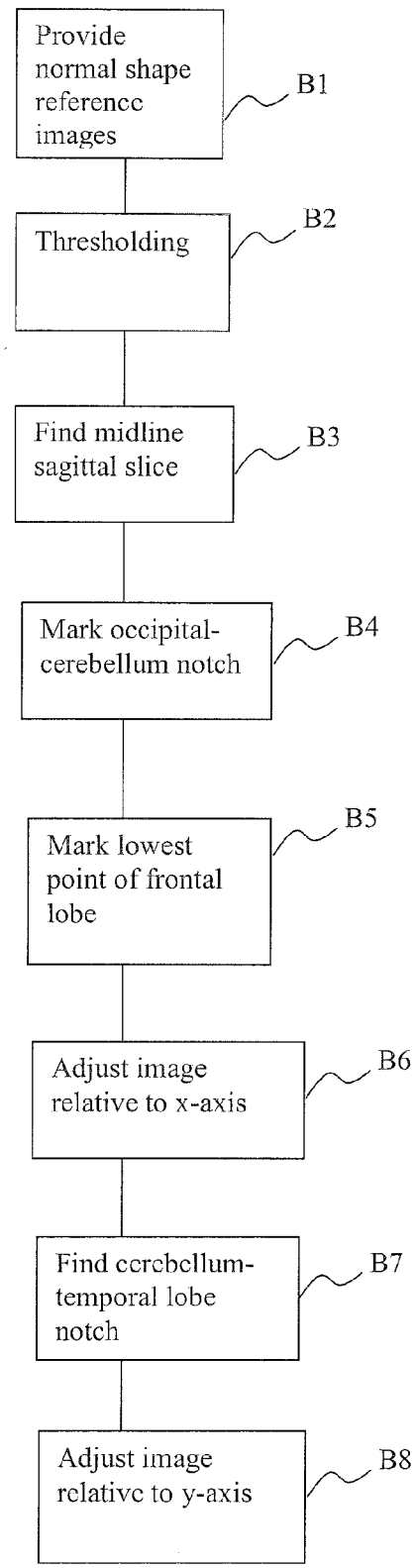
Figure 8C:
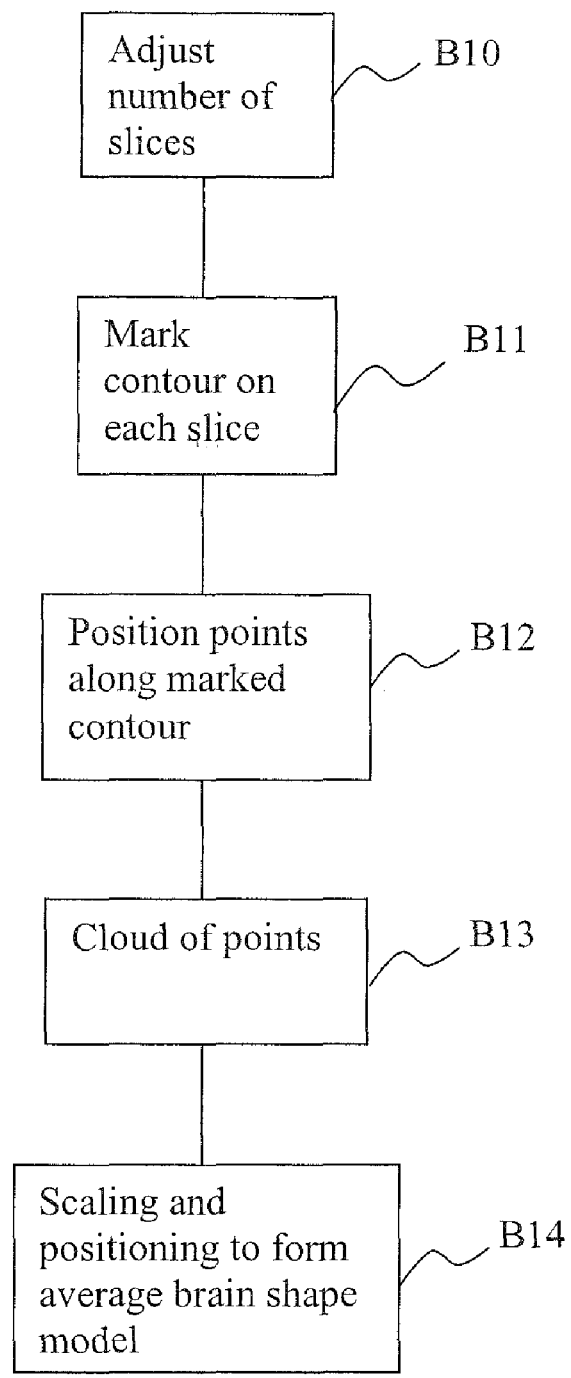
Figure 8D:
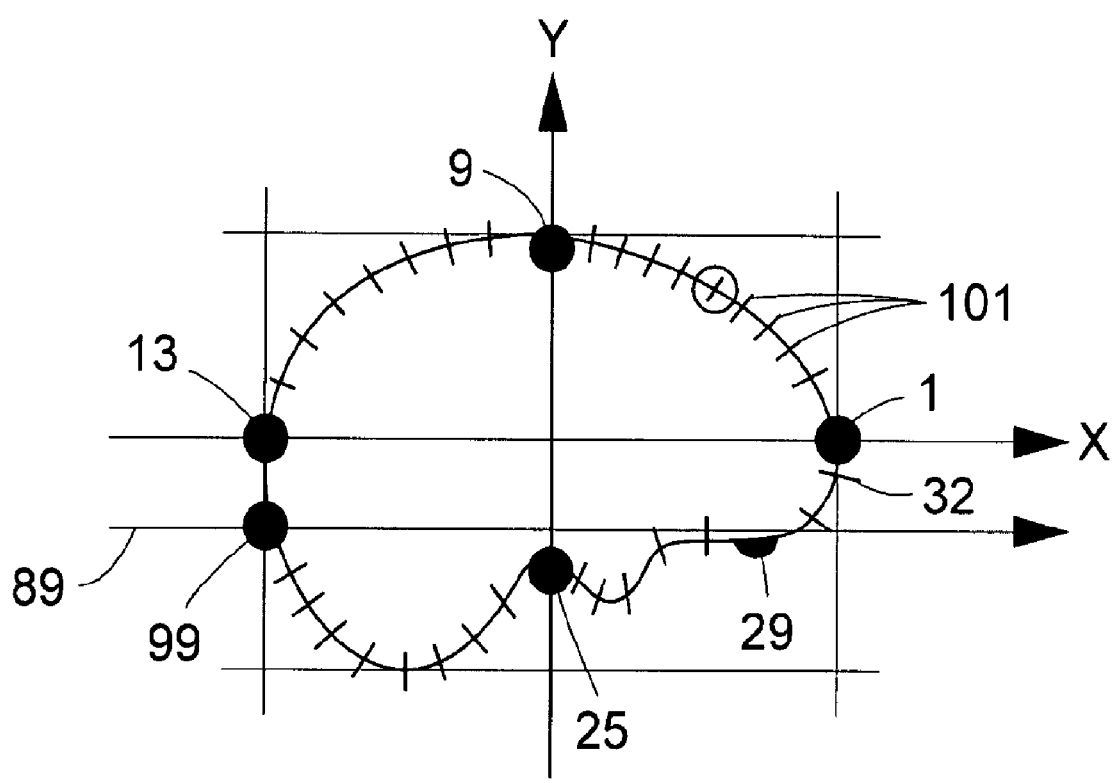

A method for creating a brain shape model is disclosed with reference to FIGS. 8b and 8d, the method comprises the following steps:
providing B1 images of a number of healthy reference brains;
making a statistical analysis of said images, including thresholding, B2;
threshold the images, i.e., assign value 1 if voxel greater that certain threshold value value, zero otherwise;
for each reference brain, provide B3 a midline sagittal slice;
for the midline sagittal slice, manually finding and marking B4 the "occipital-cerebellum notch" 29 which is an easily identifiable landmark of the brain;
for the midline sagittal slice, manually finding and marking B5 the lowest point of the frontal lobe 29, which also is an easily identifiable landmark of the brain;
drawing a line between the occipital-cerebellum notch and the lowest point of the frontal lobe;
orienting B6 the image such that said line becomes horizontal, i.e., parallel to the x-axis;
finding foremost point of frontal lobe 1;
positioning B6 the image such that the x-axis runs through foremost point of frontal lobe;
finding B7 the "cerebellum-temporal lobe notch" 25, which also is an easily identifiable landmark of the brain;
positioning B8 the image such that the y-axis runs through said cerebellum-temporal lobe notch 25;
noting the position where the x-axis crosses the border of the brain;

The finding and marking of landmarks such as "occipital-cerebellum notch" 99 and "cerebellum-temporal lobe notch" 25 need not necessarily be manual but may alternatively be performed with the aid of automatic image processing techniques as long as they perform comparable to manual methods.

With reference to FIG. 8c, the method may further comprise the following steps:

re-computing the image to comprise a predefined number of sagittal slices, e.g., 19;

manually marking B11 in each slice, by e.g., clicking out, the contour of the brain between the crossings of x- and y-axes and the contour of the brain;

automatically position B12 a predefined number of points along the contour of the brain, by the aid of the marked contour, e.g., by position eight points in each quadrant;

The positioned points, now constituting a cloud of points in a three dimensional space, is said to define the shape of each reference brain.

The next step is to create a brain model shape by scaling and positioning B14 of each cloud of points B13, e.g., by least square method, and make statistical averages for each point in relation to the same point of the other reference brains. Also other statistical measures can be calculated, such as the standard deviation and the variance. Also other measures, such as a co-variance matrix may be calculated as is known in the art of Active Shape Models. The resulting cloud of points representing an average brain model shape is in the following referred to as the "brain shape model" and is denoted c'. The making of the brain shape model is normally done only once.

The present invention further provides an iterative method for adjusting the brain shape model to a particular image of a particular patient's brain, the method comprises the following steps:

Finding a starting state c, comprising the steps of:

Providing automatically, one or more sagittal slices, preferably one or more on each side of midline of brain, and preferably near middle of hemisphere;

Thresholding the image, forming a thresholded image;

finding a direction of largest extension in thresholded image in which the thresholded image has largest extension. This can be done, e.g., by using principal component analysis, PCA.

reorienting the brain shape model c', such that the line corresponding to the x-axis in the brain shape model is oriented to be coinciding with the direction of largest extension in thresholded image, forming an adjusted brain shape model c;

position brain shape model such that the center of gravity (in three dimensions) of the brain shape model is made to coincide with the center of gravity of the thresholded image;

scale the adjusted brain shape model c to approximately become the size of the image. This may be done with the aid of for example histogram analysis;

From the starting state the adjusted brain shape model c is further adjusted in an iterative process comprising the following steps:

for each point of the adjusted brain shape model c, search D in a direction perpendicular to a surface defined by the cloud of points, after a new point which is a better candidate for being border of patients brain. This can be done by searching for a point where intensity drops from an intensity corresponding to brain tissue, to an intensity corresponding to no brain tissue.

with the aid of said new points, adjust E the adjusted brain shape model c further. This can be done e.g. by creating a form parameter vector, and multiply said form parameter with a matrix of eigenvectors to create additive adjustment terms to adjust the adjusted brain shape model c further.

The iteration is repeated until a stop criterion is fulfilled.

When the iteration is stopped the result is an adjusted brain shape model. The model may now be refined, i.e., the number of points may be increased by interpolation, for example from approximately 600 to approximately 3500.

In a step of producing the brain shape model, each point have also been assigned to a brain lobe, for example the left and right: frontal lobe 401, temporal lobe 405, parietal lobe 410, occipital lobe 415, and cerebellum 420, see FIG. 10a.

Normalisation Procedure

To be able to compare measured intensity values of the patients brain with corresponding values of a database of normal subjects, the intensity values need to be normalised in some way. This is a known problem in the art. The present invention provides a method for normalisation which by the inventors has been found particularly useful for brain images. The method comprising the following steps:

Finding a point of cerebellum having the largest intensity value. This may be done with or without filtering. With filtering the average of a 3×3×3 cube with the current voxel in the middle may be calculated. The voxels of the average may be weighted as to the amount included in a sphere with its center at the current voxel.

Setting the largest intensity value to 100% and adjusting the intensity values of the other voxels of the image accordingly.

Quantification

Figure 9A:
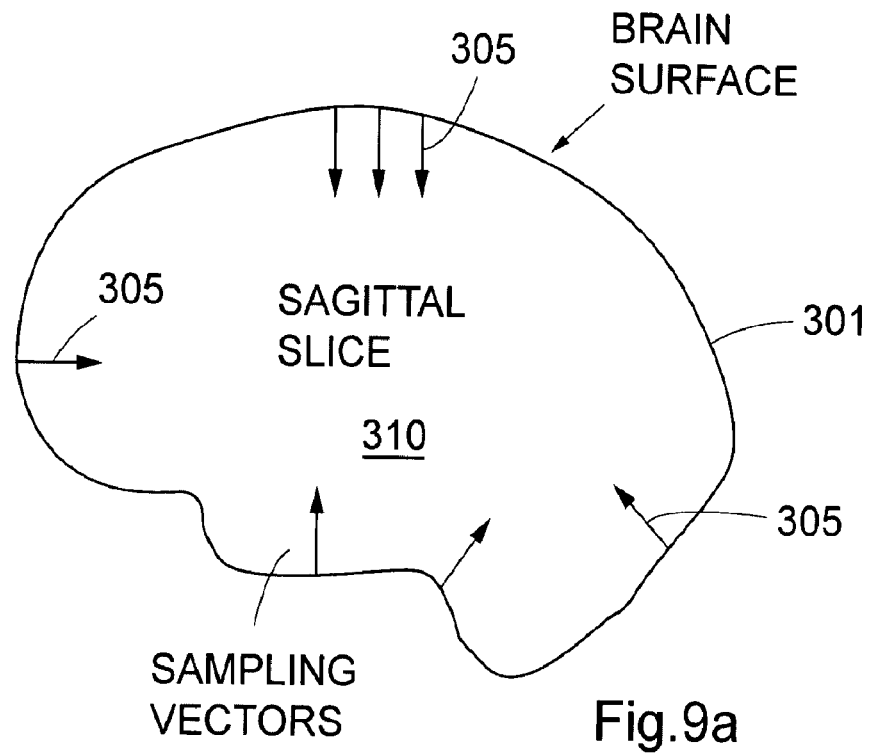
FIG. 9a is a schematic view of a sagittal brain slice showing sampling vectors penetrating brain cortex.
Figure 9B:
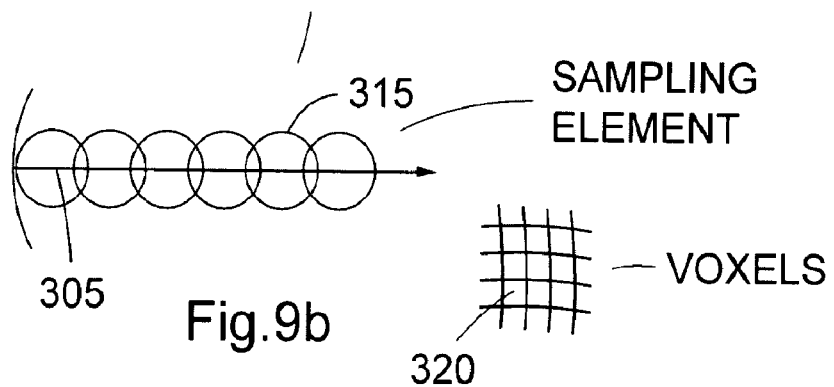
FIG. 9b is a detail of a sampling vector of FIG. 9a, showing spherical sampling elements and brain voxels.
Figure 9C:
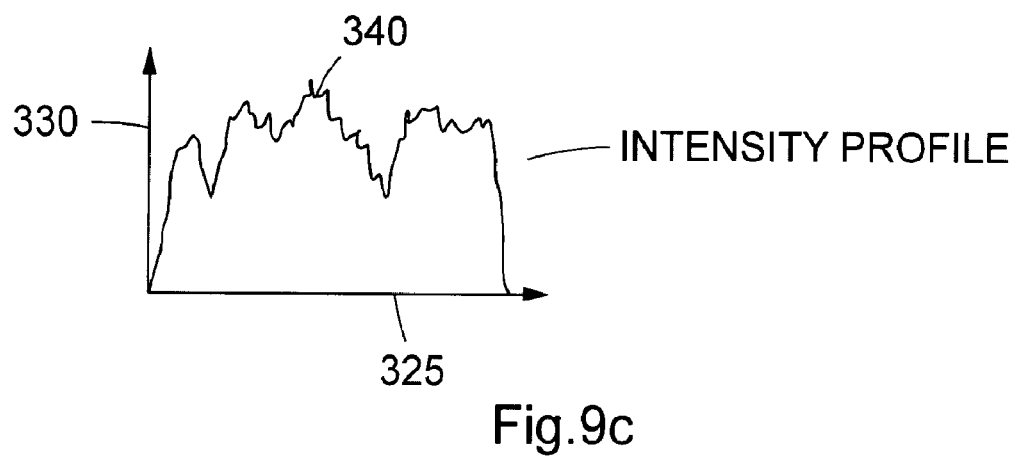
FIG. 9c is a diagram showing an intensity profile along a sampling vector.

Also provided is a method for quantification, that is, a method for assigning an intensity to each point of the cloud of points of the type that has been created by the method described above. The method of quantification comprising the following steps:

For each particular point of the cloud of points, find a line 305 of FIG. 9a extending through said particular point having a direction perpendicular to the surface outlined by said cloud of points, Along said line, make an intensity profile 340, i.e., plot intensity of brain image versus position on the line. The intensity profile may be filtered or unfiltered, Choosing an intensity value representative of the particular point. The chosen value may be the maximum value along the line but no deeper than 15 mm into the brain, which is an good approximation of the thickness of brain cortex. The value is preferably filtered as the amount included in a sphere 315 as described above.

Creation of Normal Reference and Comparing

The result of the above mentioned steps is a cloud of points, the points defining the surface of the brain of the original brain image. Each point being assigned a value corresponding to the intensity of the cortex of the original brain image.

For a physician to be able to detect abnormalities, the physician needs to know what is normal. For this purpose the invention provides a method for creating a normal intensity reference based on a normal intensity database of images of normal brains. Such a database may be the same as the one used for creating the shape model, but it may also be another database.

The method for creating a normal intensity reference comprising the following steps: same steps as the method for running a new brain through the program. However, the reorientation may preferably be done manually for all examples in the intensity reference database. Subsequently, the contour model is adjusted, a normalisation point is determined, and then intensity values for each point and region are calculated. When all values are calculated for all examples in the database, averages and standard deviations are calculated.

The cloud of points representing the patient in question is displayed side by side with the corresponding normal reference. There is also provided suitable means for displaying the cloud of points of the patient in question side by side with a z-value image. The z-value image is created by comparing corresponding areas of the patients cloud of points and of the normal reference, and a difference for each area is calculated. The difference is then expressed in number of standard deviations and the number of standard deviations are color coded. Subsequently a color coded image is created forming the z-value image.

Means are provided for rotating the images in an arbitrary direction, i.e., by clicking and dragging. Preferably the two images are arranged to rotate simultaneously such that the view of one of the images remains the same as for the other one.

Automated Classification and Automated Report Generation

The invention further provides a method for automated classification and report generation, the method comprising the following steps:

Providing an image representing variation from a reference image, in the following called a z-image;

For a number of brain cortex areas performing the following steps:

Generating a text string having the wording "The [name of cortex area] is having [term describing intensity or corresponding functionality]", where said term is taken from a table translating the z-value of the brain cortex area to corresponding expressions.

The table may translate z-values between −2 and +2 as "normal". Less than −2 as "decreased" and greater than +2 as increased, and provide a suitable colour code. read:

Automatic Second Opinion

The invention also provides a method for automatically providing a second opinion diagnosis, and also a method for training an artificial neural network to provide such a second opinion diagnosis. The method for training an artificial neural network comprising the following steps:

Providing an untrained artificial neural network;

Providing a training material of a number of brain images comprising a plurality of examples of each of a plurality of known diagnoses, where also normal is a second opinion diagnose.

Extracting a plurality of features from each of the training examples;

Training the artificial neural network, for each example, with the plurality of features as input, and the corresponding diagnoses as desired output;

Features

The performance of the network, i.e., the ability to provide the correct diagnose in so many cases as possible for brain images not part of the training material, depend on a number of factors, one of which is the choice of features. The inventors have realised this and based on knowledge, experience and skill, suggested a set of features found to be suitable for the task. This set of features comprises the following features:
1—Number of points in largest cluster of points below a certain threshold, e.g. −2 std.
2.—Total number of points below certain threshold.
3.—Standard deviation of intensity of brain in question.
4.—Cortical index, see below.
5.—z-value of right-left asymmetry.
6.—Lowest z-value for any brain region.
7.—Number of brain regions with z-value below certain threshold.

Cortical Index

Cortical index is the portion of active brain tissue inside the cloud of points. cortical index may be calculated by setting a threshold value corresponding to the boundary between active brain tissue and others. The number of voxels above the threshold value inside the outline of the brain surface is determined and is divided by the total number of voxels inside said outline. This produces the amount of active brain tissue inside the surface of the brain, in contrast to e.g., ventricles, connective tissue and non-perfused tissue.

The invention claimed is:

1. A method for automatic interpretation of a three dimensional medicine image representing a body organ where said method comprises the following steps:
   (a) automatically rotating the images to adjust for accidental tilting when the images were originally taken;
   (b) automatically finding the contours of the organ;
   (c) automatically adjusting size, position, rotation, and shape of a predefined model shape of the type of organ in question to fit the organ of the current image;
   (d) automatically, with the aid of the model shape, defining certain portions of the image;
   (e) normalizing the intensity of the image;
   (f) quantifying each point in the image of the organ, producing a quantification result;
   (g) feeding the quantification results to an interpretation system;
   (h) letting the interpretation system interpret the image, producing an interpretation result; and
   (i) presenting the interpretation result.

2. The method for interpretation of claim 1, where the organ is the brain and said normalization is performed by giving an area of the cerebellum with highest activity a reference value corresponding to 100%.

3. The method for interpretation of claim 1, where the organ is the brain and where said quantifying of each point in the image of the brain involves sampling along a vector perpendicular to the contour of the brain.

4. The method for interpretation of claim 1, where the organ is the brain and where intensity values are produced both point-by-point and region-by-region.

5. A method for automatic normalization of brain images comprising the step of:
   using a brain atlas and active shape models with a cerebellum as reference.

6. A method for classification of images comprising the steps of:
   feeding the quantification results of claim 1 to an artificial neural network.

7. A method for reorientation of brain images into a common coordinate system, comprising the following steps:
   for each reference brain, providing a midline sagittal slice;
   for the midline sagittal slice, finding and marking an occipital-cerebellum notch;
   for the midline sagittal slice, finding and marking the lowest point of the frontal lobe;
   drawing a line between the occipital-cerebellum notch and the lowest point of the frontal lobe;
   orienting the image such that said line becomes horizontal, and parallel to the x-axis;
   finding foremost point of frontal lobe;
   position the image such that the x-axis runs through foremost point of frontal lobe;
   finding the cerebellum-temporal lobe notch; and
   positioning the image such that the y-axis runs through said cerebellum-temporal lobe notch.

8. A method, comprising:
   determining a contour of an organ in a patient's body, from an image of the organ in at least three dimensions, by adjusting a predefined contour model to the image, wherein said body organ is a brain;
   wherein determining a contour of the brain is performed by an image contour modeling system configured for modeling the image of the brain into one of two or more classes where one class is normal and one class is pathological, the image modeling system comprising:
a pretrained artificial neural network having a plurality of input nodes, and a number of output nodes; and
a feature extractor, capable of extracting a number of features from the image, said features being suitable for feeding to the input nodes;
wherein the pretrained artificial network presents a classification result on the number of output nodes when the number of features of the image is fed to the plurality of input nodes.

9. The method of claim 8, wherein said number of features comprises a total number of points inside the contour of the brain depicted in the image.

10. The method of claim 8, wherein said number of features comprises number of points in largest cluster of points below a certain threshold inside the contour of the brain depicted in the image.

* * * * *

UNITED STATES PATENT AND TRADEMARK OFFICE
CERTIFICATE OF CORRECTION

| | |
|---|---|
| PATENT NO. | : 8,199,985 B2 |
| APPLICATION NO. | : 12/294112 |
| DATED | : June 12, 2012 |
| INVENTOR(S) | : Jakobsson et al. |

Page 1 of 1

It is certified that error appears in the above-identified patent and that said Letters Patent is hereby corrected as shown below:

In column 14, line 52, in Claim 7, after "horizontal", delete ",", therefor

Signed and Sealed this
Ninth Day of October, 2012

David J. Kappos
*Director of the United States Patent and Trademark Office*